(12) United States Patent
Kobayashi et al.

(10) Patent No.: US 6,573,960 B2
(45) Date of Patent: Jun. 3, 2003

(54) LIQUID CRYSTAL DEVICE HAVING OPENING IN REFLECTION FILM OUTSIDE PIXEL AREA FOR EVALUATING COLOR FILTER AND LIGHT SHIELD, ITS METHOD, AND APPARATUS

(75) Inventors: Masaki Kobayashi, Hotaka-machi (JP);
Keiji Takizawa, Hotaka-machi (JP);
Yoshio Yamaguchi, Matsumoto (JP);
Chihiro Tanaka, Matsumoto (JP)

(73) Assignee: Seiko Epson Corporation (JP)

( * ) Notice: Subject to any disclaimer, the term of this patent is extended or adjusted under 35 U.S.C. 154(b) by 109 days.

(21) Appl. No.: 09/799,364

(22) Filed: Mar. 5, 2001

(65) Prior Publication Data

US 2001/0033350 A1 Oct. 25, 2001

(30) Foreign Application Priority Data

Mar. 15, 2000 (JP) ........................................ 2000-073083

(51) Int. Cl.[7] .............................................. G02F 1/1335
(52) U.S. Cl. ...................... 349/113; 349/106; 349/110; 349/187; 324/770
(58) Field of Search ................................ 349/106, 110, 349/111, 113, 187, 192; 324/770

(56) References Cited

U.S. PATENT DOCUMENTS 6,124,909 A * 9/2000 Miyashita et al. .......... 349/109
6,281,952 B1 * 8/2001 Okamoto et al. ............. 349/12

* cited by examiner

*Primary Examiner*—Robert H. Kim
*Assistant Examiner*—Andrew Schechter
(74) *Attorney, Agent, or Firm*—Harness, Dickey & Pierce, P.L.C.

(57) ABSTRACT

A liquid crystal device which has a plurality of pixels and which is configured in such a manner that a counter substrate is opposed to a color filter substrate with a liquid crystal interposed therebetween. The color filter substrate has a reflection film on the surface of a substrate body. Blue, green, and red colored layers, are formed on the surface of the reflection film in matrix form so as to correspond to the respective pixels. A light shield layer is formed between the colored layers. Colored layers for color characteristic evaluation and a light shield layer for optical density measurement are provided in an area located outside an effective pixel area of the color filter substrate. The reflection film is not formed between the colored layers for color characteristic evaluation and the substrate body and between the light shield layer for optical density measurement and the substrate body.

21 Claims, 10 Drawing Sheets

LIQUID CRYSTAL DEVICE HAVING OPENING IN REFLECTION FILM OUTSIDE PIXEL AREA FOR EVALUATING COLOR FILTER AND LIGHT SHIELD, ITS METHOD, AND APPARATUS

BACKGROUND OF THE INVENTION

Technical Field of the Invention

The present invention relates to a liquid crystal device, its manufacturing method, and an electronic apparatus. More specifically, the invention relates to a liquid crystal device having a color filter layer, its manufacturing method, and an electronic apparatus.

DISCUSSION

Liquid crystal display devices are displays in which a liquid crystal is interposed between a pair of substrates that are opposed to each other, and perform display by modulating light that passes through the liquid crystal in accordance with the orientation of the liquid crystal. The reflection type and the transmission type are known as display modes of liquid crystal display devices.

FIG. 12 shows a reflection display type passive matrix liquid crystal device 500 as an example of those kinds of liquid crystal devices. A liquid crystal layer 160 is interposed between a pair of substrates 120 and 140 that are opposed to each other, and image display or the like is performed by modulating light that passes through the liquid crystal in accordance with the orientation of the liquid crystal layer 160. Transparent electrodes 240a made of indium tin oxide (hereinafter referred to as "ITO") or the like are provided on a surface, opposed to the substrate 140, of the substrate 120. A light-reflective metal film (reflection film) 300 is provided on a surface, opposed to the substrate 120, of the substrate 140, and a color filter layer consisting of colored layers 200a, 200b, and 200c of blue, green, and red, respectively, and transparent electrodes 240b are provided on the metal film 300. Pixels are formed at regions where the transparent electrodes 240a and 240b cross each other, and the colored layers are provided so as to correspond to the respective pixels. A light shield layer 240 to serve as a black matrix is formed between the colored layers. A protective layer 220 is formed on the colored layers and the light shield layer 240, and the transparent electrodes 240b are formed on the protective layer 220.

In the liquid crystal device 500, incident light coming from the substrate 120 side is converted by the colored layers 200a, 200b, and 200c into light beams $P_1$, $P_2$, and $P_3$ that are colored in blue, green, and red, respectively, which are reflected by the reflection film 300 and outputted from the substrate 140 side. Combined light P of the light beams $P_1$, $P_2$, and $P_3$ is recognized as a color image.

Since reflection display type liquid crystal devices of the above kind can perform display by using ambient light such as light of a fluorescent lamp, natural light, or the like without the need for incorporating a light source such as a backlight, they are advantageous in terms of power consumption and hence are widely used in portable display apparatus, etc.

Incidentally, to keep proper display color characteristics of a color image, it is necessary to manage the blue, green, and red color characteristics of the color filter layer individually. Since usually the color filter layer is produced by a dyeing method or a pigment dispersion method in which a resin or the like is applied by spin coating, the thickness subtly varies from one substrate produced to another. As a result, the color characteristics of the color filter layer slightly vary from one substrate to another. For this reason, in managing the color filter layer, it is necessary to measure the color characteristics on a substrate-by-substrate basis.

However, reflection type liquid crystal display devices of the above kind have a problem that if measurement light is made incident from the back surface (outside) of the color filter layer side substrate according to the ordinary color characteristic evaluation method, the measurement light does not reach the color filter layer because it is reflected by the reflection film. Further, if measurement light is made incident from the front surface (color filter layer side) of the substrate, the measurement light that has passed through the color filter layer is reflected by the reflection film and passes through the color filter layer again, that is, reflection light is measured. This results in another problem that the color characteristics of the color filter layer cannot be evaluated with high accuracy. The same is true of a case of measuring the optical density (OD value) that represents a light shield state of the light shield layer. The OD value is given by $$OD = -\log_{10}(I/I_0) \qquad (1)$$

where $I_0$ is the intensity of input light to the light shield layer and I is the intensity of transmission light. The light shield performance is better when this value is larger.

An object of the present invention is to provide a liquid crystal device that is improved in color characteristics and light shield characteristic, its manufacturing method, and an electronic apparatus by solving the above problems in liquid crystal devices and thereby performing, with high accuracy, evaluation of the color characteristics of the individual colored layers of the color filter layer and measurement of the optical density of the light shield layer.

SUMMARY OF THE INVENTION

To attain the above object, the invention provides a liquid crystal device in which a liquid crystal layer is interposed between a color filter substrate and a counter substrate that is opposed to the color filter substrate, characterized in that the color filter substrate has, on a surface opposed to the counter substrate, a reflection film and a color filter layer including blue, green, and red colored layers and a light shield layer that is provided between the colored layers; that colored layers for color characteristic evaluation and a light shield layer for optical density measurement are provided outside an effective pixel area of the color filter substrate, the colored layers for color characteristic evaluation being provided at least one for each color; and that each region where the colored layers for color characteristic evaluation and the light shield layer for optical density measurement is formed has a portion where the reflection film is not provided.

With this configuration, since light passes through the portions where the reflection film is not formed, color characteristic evaluation of the colored layers and optical density measurement of the light shield layer can be performed with high accuracy by measuring a spectrum of transmitted light.

Since the color filter layer for color characteristic evaluation and the light shield layer for optical density measurement are provided outside the effective pixel area, the color characteristics, etc. can be evaluated at a position close to the color filter layer and the light shield layer in the actual image display area. Therefore, the measurement accuracy is further increased and miniaturization of liquid crystal devices can be attained.

The invention provides a liquid crystal device in which a liquid crystal layer is interposed between a color filter substrate and a counter substrate that is opposed to the color filter substrate, characterized in that the color filter substrate has, on a surface opposed to the counter substrate, a reflection film and a color filter layer including blue, green, and red colored layers and a light shield layer that is provided between the colored layers; that colored layers for color characteristic evaluation and a light shield layer for optical density measurement are provided outside an effective pixel area of the color filter substrate, the colored layers for color characteristic evaluation being provided at least one for each color; and that each region where each of the colored layers for color characteristic evaluation and the light shield layer for optical density measurement is formed has part of the reflection film formed with a window.

With this configuration, since light passes through the windows, color characteristic evaluation of the colored layers and optical density measurement of the light shield layer can be performed with high accuracy by measuring a spectrum of transmitted light.

Since the colored layers for color characteristic evaluation and the light shield layer for optical density measurement are provided outside the effective pixel area, the characteristic evaluation can be performed in a state that color characteristics are close to those of an actual display image. Therefore, the measurement accuracy is further increased and miniaturization of liquid crystal devices can be attained.

In the liquid crystal device according to the invention, it is preferable that the diameter of the windows be 30 $\mu$m or more.

It is preferable that the colored layers for color characteristic evaluation and the light shield layer for optical density measurement be provided in a parting pixel area.

In particular, it is preferable that the colored layers for color characteristic evaluation and the light shield layer for optical density measurement be provided in the parting pixel area at positions close to two respective corners that are located on a diagonal line of the effective pixel area and opposed to each other.

It is preferable that the light shield layer for optical density measurement be formed by stacking the colored layers of the respective colors.

Further, it is preferable that in the effective pixel area of the color filter substrate the reflection film be formed with second windows for the respective colored layers.

The invention provides a manufacturing method of a liquid crystal device, characterized by causing light to pass through the portions where the reflection film is not provided or the windows of the colored layers for color characteristic evaluation and the light shield layer for optical density measurement; and performing color characteristic evaluation of the colored layers and optical density measurement of the light shield layer by obtaining a spectrum of resulting transmission light.

The invention provides an electronic apparatus characterized by being provided with the above liquid crystal device.

DETAILED DESCRIPTION OF THE PREFERRED EMBODIMENTS

A liquid crystal device according to the invention will be hereinafter described with reference to FIGS. 1 to 5. The liquid crystal device of the invention means a liquid crystal device having at least a color filter substrate (described later) and a counter substrate that is opposed to the color filter substrate with a liquid crystal interposed therebetween. However, the invention imposes no particular limitations on other components such as electrodes and image control devices, which can be provided when necessary in accordance with the operation scheme (TFT scheme, TFD scheme, or the like) of the liquid crystal device.

Figure 1:
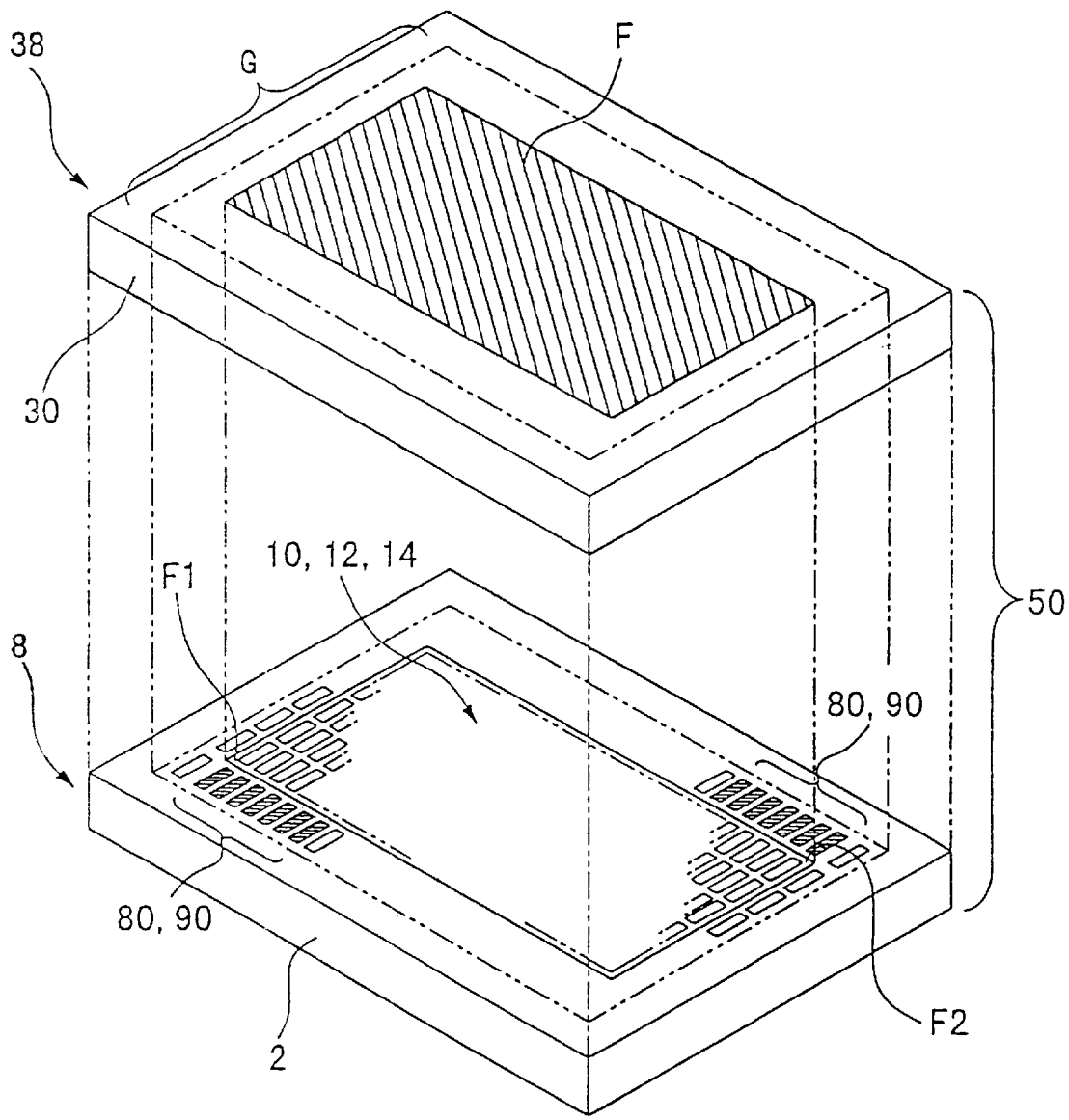
FIG. 1 is a perspective view generally showing a liquid crystal device according to the present invention.

As shown in FIG. 1, a color filter substrate 8 is opposed to a counter substrate 38 at a prescribed interval and a liquid crystal layer (not shown) is interposed between the substrates 8 and 38, whereby a liquid crystal device 50 is formed as a whole. In a plan view of the liquid crystal device 50, an image is displayed in an effective pixel area F and the portion outside the effective pixel area F is a frame portion. As described later in detail, in the color filter substrate 8, colored layers 10, 12, and 14 of respective colors are formed at positions corresponding to respective pixels and colored layers of pixels of one row or one column are provided outside the periphery of the effective pixel area F so as to surround it, and this portion forms a parting pixel area G. Further, in the parting pixel area G, colored layers 80 for color characteristic evaluation and a light shield layer 90 for optical density measurement are arranged in the horizontal direction in the figure at positions close to two corners F1 and F2 that are located on the diagonal line (the bottom-left to top-right line in the figure) of the effective pixel area F and opposed to each other. The "parting pixel area" means a portion formed by pixels that are formed with colored layers but do not constitute an image to be recognized. Although in the above-described embodiment the parting pixel area G has a width of one pixel, the invention is not limited to such a case and a parting pixel area having a width of a plurality of pixels may be formed. A prescribed parting light shield portion is formed on the counter substrate 38 side so as to occupy an area corresponding to the parting pixel area G.

Next, the structure of the liquid crystal device 50 will be described with reference to FIG. 2. In this embodiment, the liquid crystal device 50 is an active matrix liquid crystal device having TFDs (thin-film diodes) serving as switching devices. A plurality of pixel electrodes 32 that are transparent electrodes made of ITO (indium thin oxide) or the like and TFDs 36 for controlling the pixel electrodes 32 are provided in matrix form on the side of the counter substrate 38 as a device substrate, that is, on a surface, opposed to the color filter substrate, of a substrate body 30 made of quartz or the like. The TFDs 36 are connected to scanning lines 34 and adjust the orientation of the liquid crystal based on scanning signals and signals that are applied to data lines (transparent electrodes; described later) 22.

The color filter substrate 8 is produced in the following manner. First, a reflection film 4 that is a metal film is formed on a surface, opposed to the counter substrate, of a substrate body 2 made of quartz or the like so as to cover at least most of the display area. Blue colored layers 10 (given a symbol "B" in the figure), green colored layers 12 ("G"), and red colored layers 14 ("R") are formed in matrix form on the reflection film 4 at such positions as to be opposed to the respective pixel electrodes 32 of the counter substrate 38 (i.e., at positions corresponding to the respective pixels). Their colors are the three primary colors of light. The colored layers 10, 12, and 14 are separated from each other and a light shield layer 6 is formed between those layers. The colored layers and the light shield layer constitute a color filter layer. A protective layer (not shown) is formed on the color filter layers 10, 12 and 14, and the strip-like data lines 22 made of ITO are formed on the protective layer so as to cross the extension direction of the scanning lines 34.

Although the scanning lines and the data lines are provided on the counter substrate side and the color filter substrate side, respectively, another configuration is possible in which the lines 34 on the counter substrate side where the devices are arranged are made into data lines and the lines 22 on the color filter substrate side are made into scanning lines.

High-reflectance materials such as aluminum, silver, and alloys thereof can be used as the metal film to serve as the reflection film 4, and each of the colored layers 10, 12, and 14 can be produced by a dyeing method or a pigment dispersion method, for example. Since the colors of the respective colored layers are the three primary colors of light (R, G, and B), it is preferable that R, G, and B be arranged cyclically in one direction. For example, in this embodiment, R, G, and B are arranged cyclically from left to right on the color filter substrate 8. R, G, and B may be arranged cyclically in the direction perpendicular to the above direction.

Figure 2:
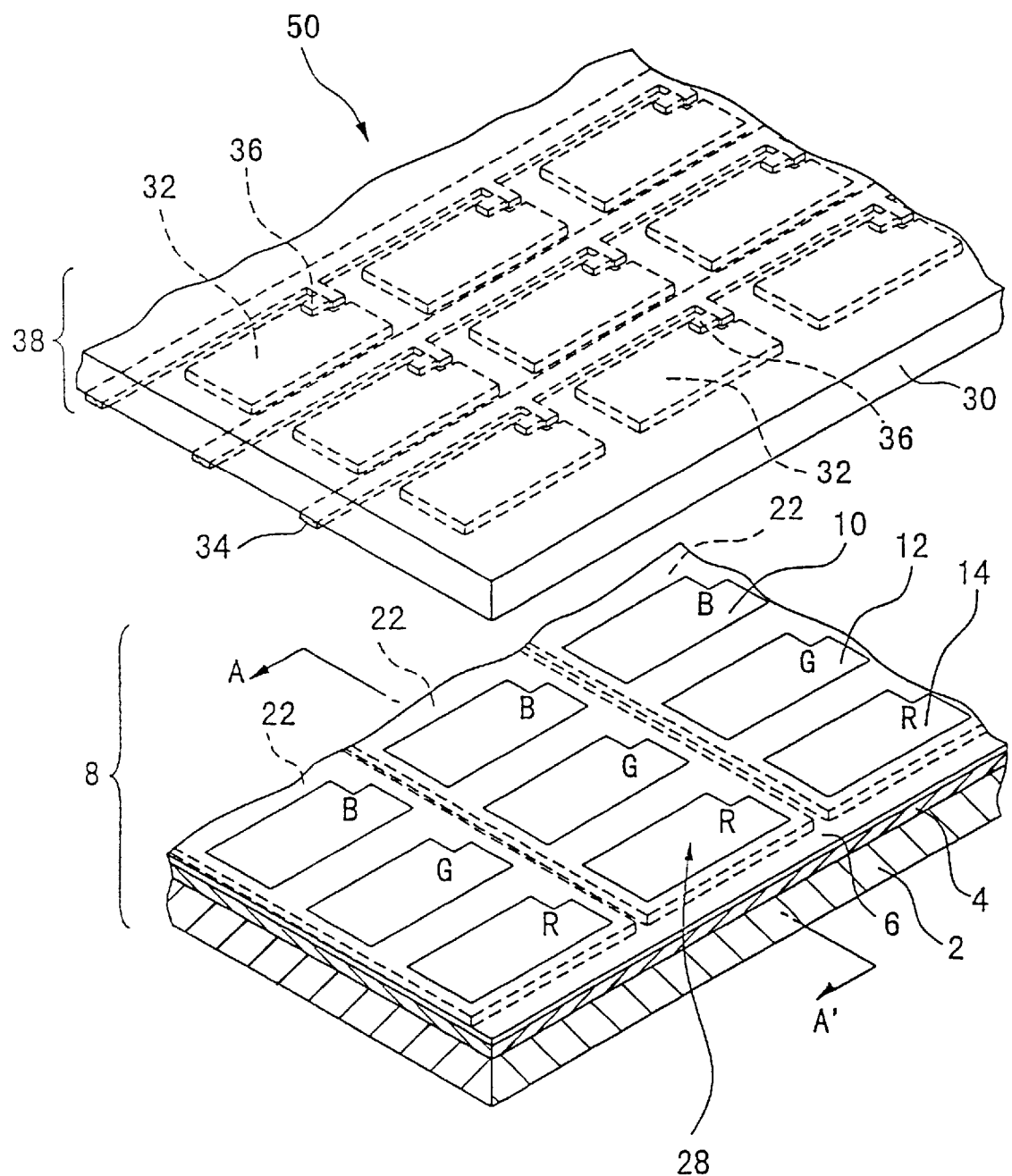
FIG. 2 is a perspective view for description of the structure of the liquid crystal device according to the invention.
Figure 3:
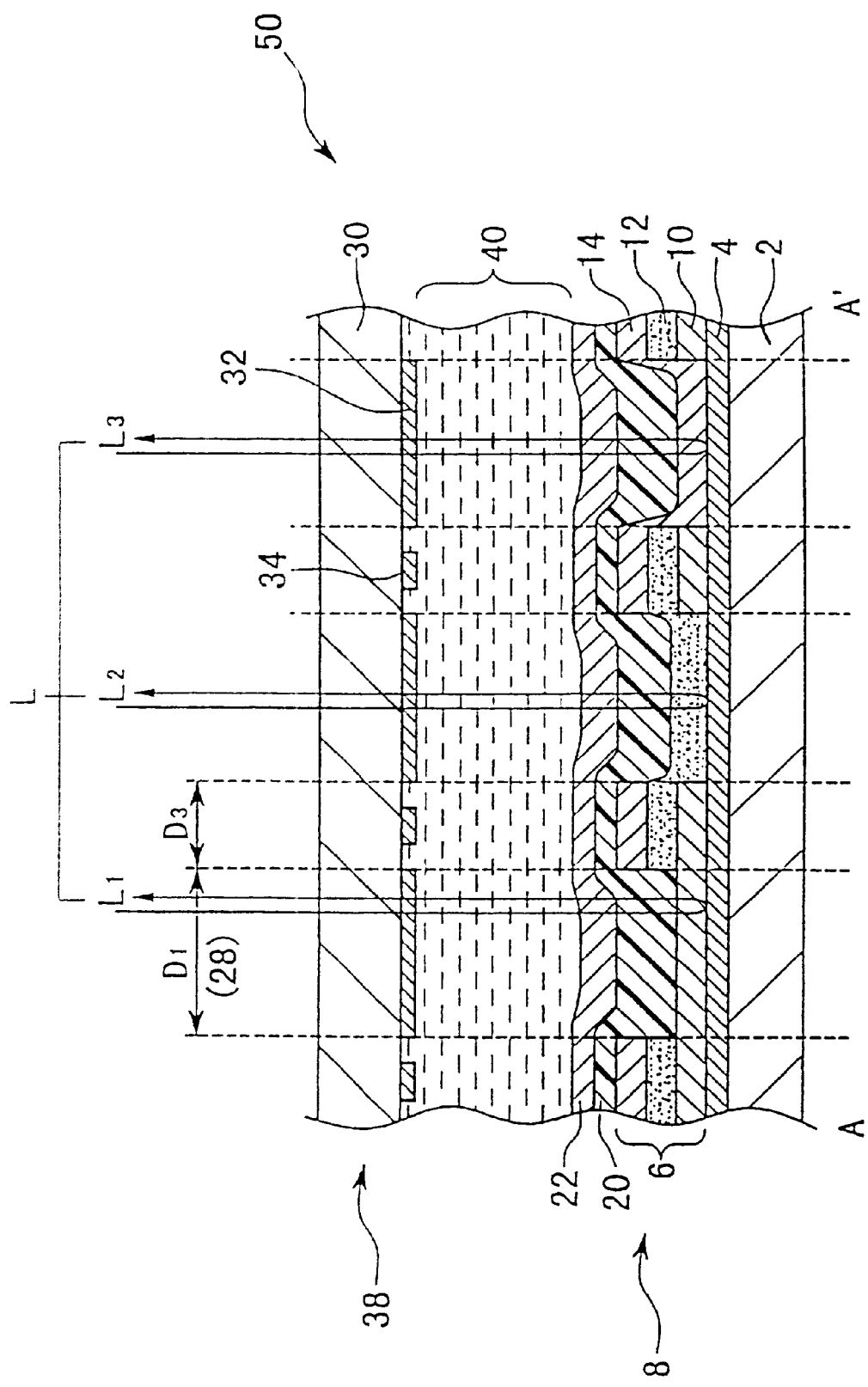
FIG. 3 is a sectional view taken along line A–A' in FIG. 2.

A sectional structure of the liquid crystal device 50 taken along line A–A' in FIG. 2 is as shown in FIG. 3.

As shown in this figure, a region including each pixel electrode 32 is a reflection display region (region $D_1$ in the figure). On the other hand, the light shield layer 6 is produced by forming a blue colored layer 10 as the lowermost layer and then stacking other color layers 12 and 14 thereon sequentially. Light incident on the light shield layer 6 is absorbed by the colored layers 10, 12, and 14 and thereby interrupted. In this case, in each region $D_1$, incident light coming from the outside of the counter substrate 38 is colored by one of the colored layers 10, 12, and 14. After being reflected by the reflection film, the light travels from the colored layer 10, 12, or 14 in the direction reverse to the incident direction and is outputted from the substrate 30 side. Light beams $L_1$, $L_2$, and $L_3$ are combined with each other and recognized as an image L. A protective layer 20 made of an acrylic resin or the like is formed on the colored layers 10, 12, and 14 and the light shield layer 6, and the data lines 22 are formed on the protective layer 20.

Next, the colored layers 80 for color characteristic evaluation and the light shield layer 90 for optical density measurement that are formed on the color filter substrate 8 will be described with reference to FIG. 4. As described above, to keep proper display color characteristics of a color image, it is necessary to manage the blue, green, and red color characteristics of the color filter layer individually for each substrate manufactured. The colored layers 80 for color characteristic evaluation and the light shield layer 90 for optical density measurement are used for such management.

Figure 4:
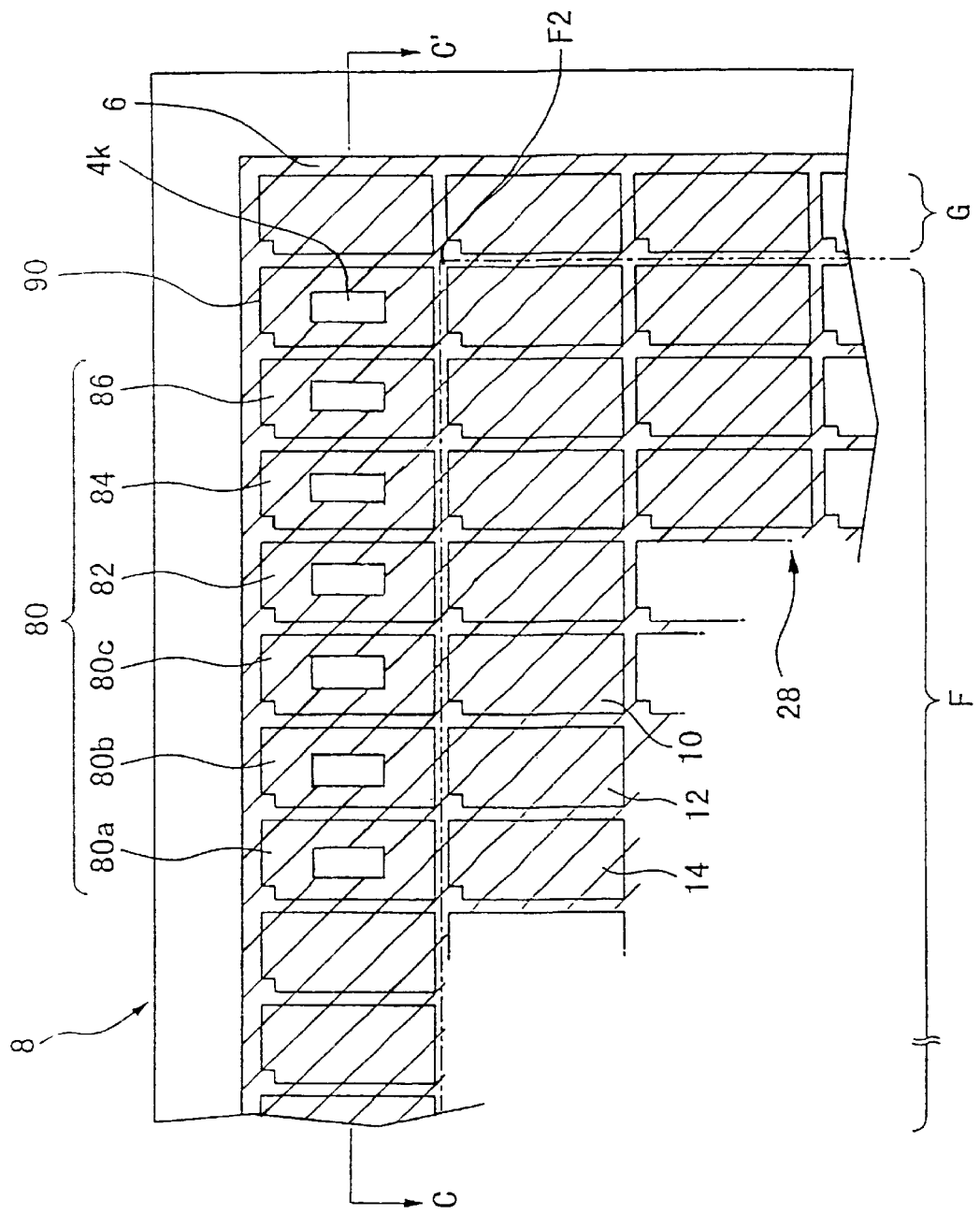
FIG. 4 is a plan view of a color filter substrate.

As shown in FIG. 4, oblong (longer in the vertical direction) colored layers 10, 12, and 14 (corresponding to the respective pixels) are arranged in the effective pixel area F on the substrate body 2 and the parting pixel area G that surrounds the effective pixel area F. The colored layers 10, 12 and 14 are arranged cyclically in the row or column direction. The colored layers 80 for color characteristic evaluation and the light shield layer 90 for optical density measurement are arranged in the horizontal direction in the parting pixel area G that is close to the corner F2 of the effective pixel area F. The colored layers 80 for color characteristic evaluation comprise a colored layer 80a for red (R) characteristic evaluation, a colored layer 80b for green (G) characteristic evaluation, a colored layer 80c for blue (B) characteristic evaluation, a colored layer 82 for red/green superimposition color (RG) characteristic evaluation, a colored layer 84 for green/blue superimposition color (GB) characteristic evaluation, and a colored layer 86 for blue/red superimposition color (BR) characteristic evaluation that are arranged in this order from the left in the figure. The light shield layer 90 for optical density measurement is provided on the right of the colored layer 86. The reflection film 4 is formed with rectangular windows 4k under the colored layers 80 for color characteristic evaluation and the light shield layer 90 for optical density measurement. That is, each of the portions where the colored layers for color characteristic evaluation and the light shield layer for optical density measurement are provided has a portion where the reflection film is not formed. Transmission light is obtained through the windows 4k, that is, the portions where the reflection film is not formed. This will be explained with reference to FIG. 5, which is a sectional view taken along line C–C' in FIG. 4.

Figure 5:
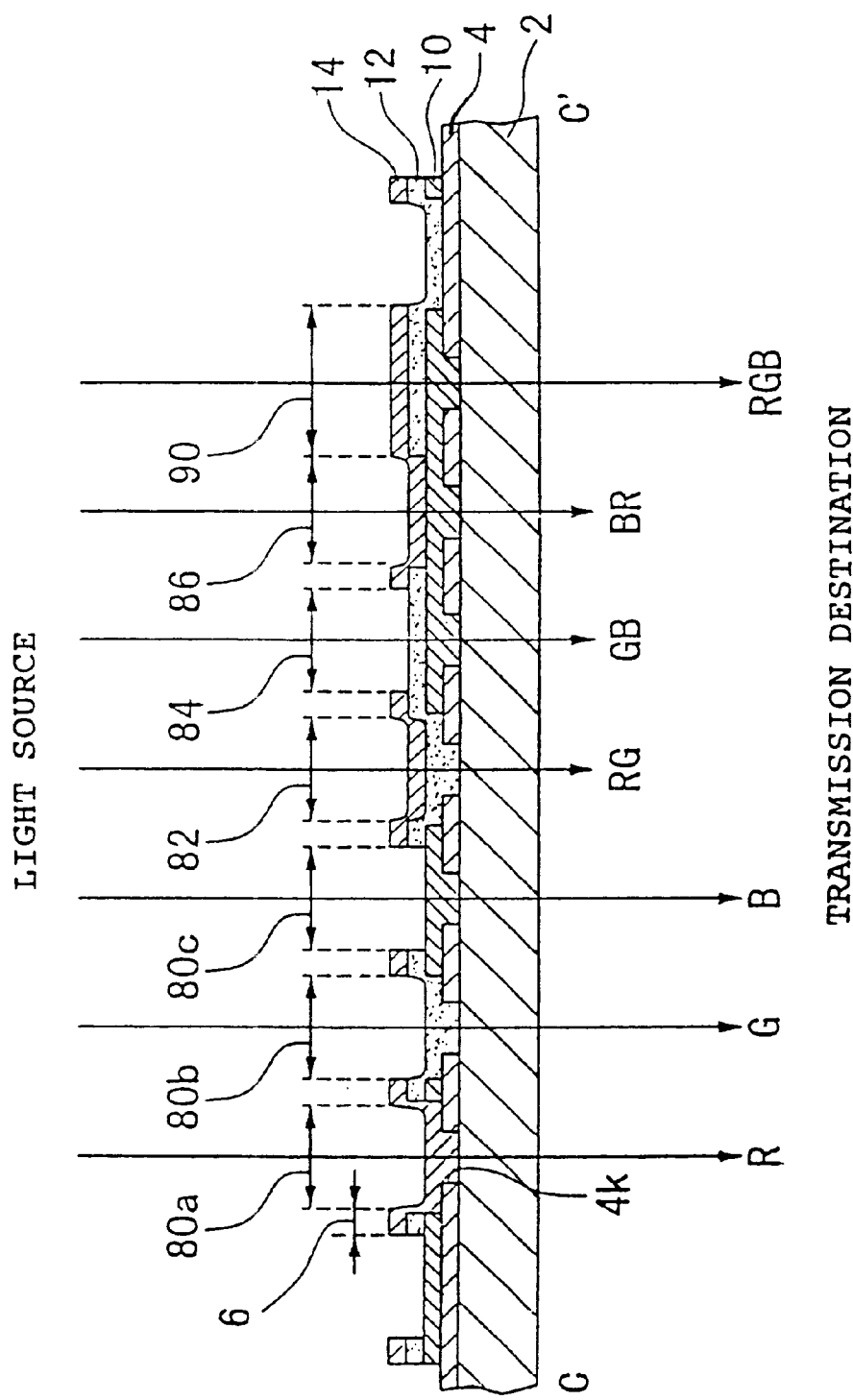
FIG. 5 is a sectional view taken along line C–C' in FIG. 4.

As shown in FIG. 5, source light incident on the substrate body 2 from below passes through the windows 4k and the individual color filter layers and is output to the space above the substrate body 2. Therefore, even in the reflection display type liquid crystal device, light that has passed through, rather than has been reflected from, the color filter layer is obtained and color characteristic evaluation of the color filter layer and optical density measurement of the light shield layer can be performed with high accuracy by measuring spectra of this transmitted light. Since this makes it possible to properly manage the color characteristics, etc. of products so that they fall within management ranges, liquid crystal devices that are superior in color characteristics and light shield characteristic can be obtained. It is noted that source light may be made so that it is incident to the substrate body 2 from above.

Since the colored layers 80 for color characteristic evaluation and the light shield layer 90 for optical density measurement are provided in the parting pixel area G that is provided outside the effective pixel area F, preferably immediately outside the effective pixel area F, the color characteristics, etc. can be evaluated at the positions close to the colored layers and the light shield layer of the actual image display area and the measurement accuracy is increased further. The formation of the colored layers 80 and the light shield layer 90 outside the effective pixel area F increases the planar size of the liquid crystal panel by only about 100 µm, the liquid crystal device can be miniaturized. Since colored layers of two colors are superimposed one on another in each of the colored layers 82, 84, and 86, characteristic evaluation of superimposed colors can be performed by using those portions. Although in this embodiment each of the light shield layer 6 for separating the pixels and the light shield layer 90 for optical density measurement is formed by stacking the colored layers 10, 12 and 14, the invention is not limited to such a case. For example, a light shield layer formed by adding carbon black or the like to a resin may be formed separately from the individual colored layers. The colored layers 80 and the light shield layer 90 may be formed at arbitrary positions in the parting area. However, forming the colored layers 80 and the light shield layer 90 at the two positions close to the corners F1 and F2 on the diagonal line of the effective pixel area F in the above-described manner enables measurement of in-plane unevenness (film thickness or pigment dispersion) of the color filter layer of the color filter substrate in addition to the color characteristics of the respective colored layers and the optical density. There are no particular limitations on the number of the colored layers 80 and the number of the light shield layers 90 formed.

Incidentally, actual color characteristic evaluation and optical density measurement are performed usually by measuring transmission light with a microspectroscope. In this case, it is preferable that the diameter of the windows 4k be 30 µm or more because if it is less than 30 µm the measurement with a microspectroscope is difficult. Where the windows are rectangular, the length of the shorter side (extending in the horizontal direction in FIG. 4) is regarded as the "diameter of the windows."

Figure 6:
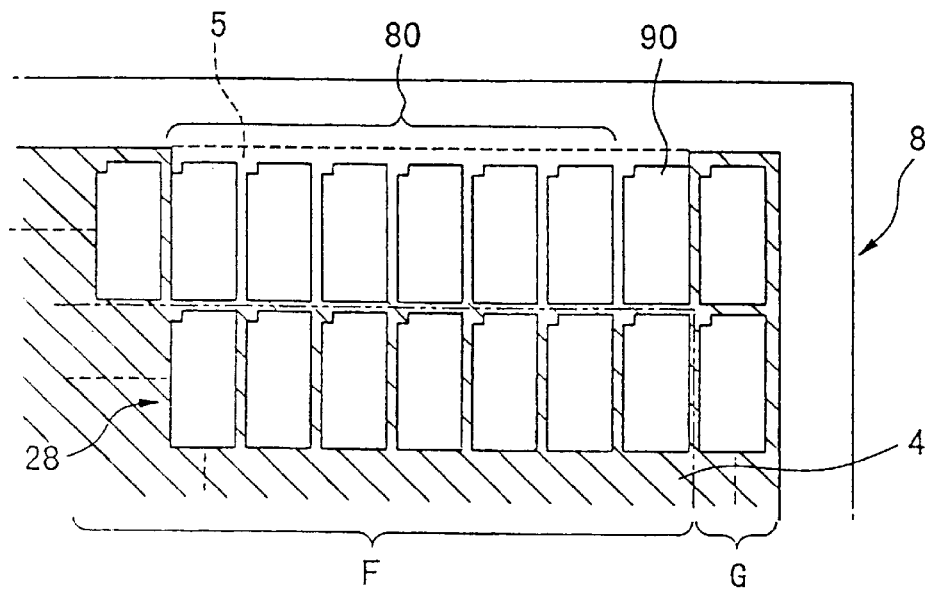
FIG. 6 is a plan view showing another example of the color filter substrate.

The invention is not limited to the above embodiment. For example, it is possible to provide, in a manner shown in FIG. 6, a portion 5 where the reflection film is not formed under the colored layers 80 for color characteristic evaluation and the light shield layer 90 for optical density measurement and perform color characteristic evaluation and optical density measurement by causing light to pass through the portion 5.

Figure 7:
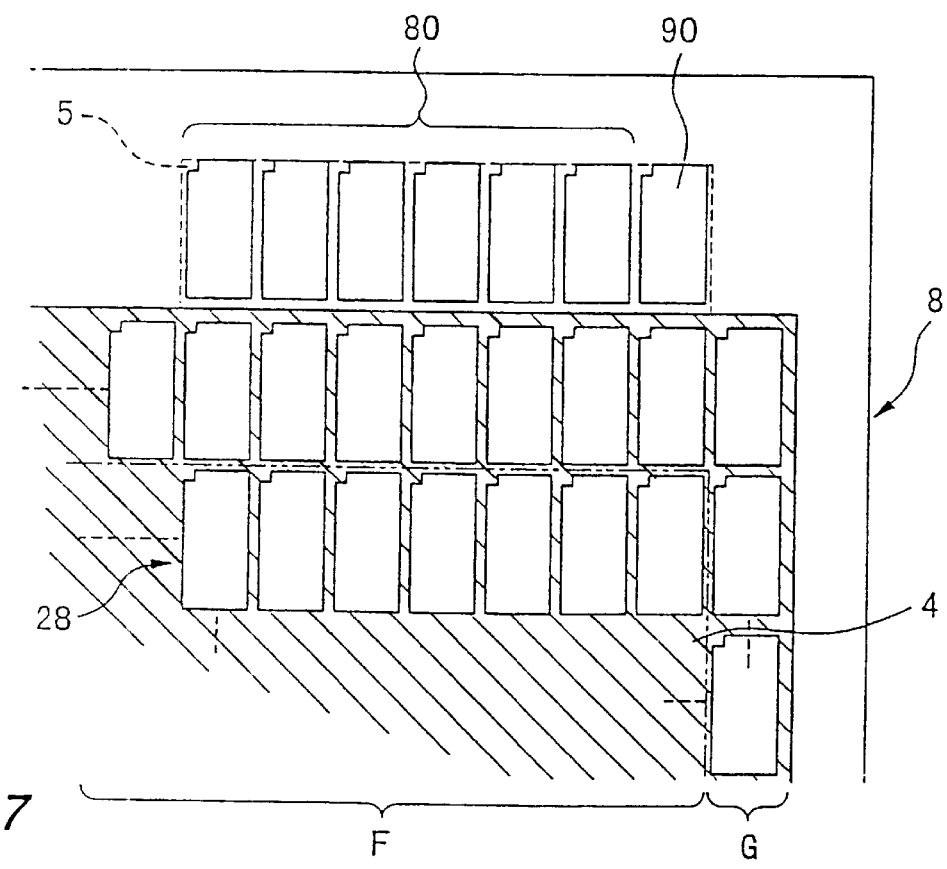
FIG. 7 is a plan view showing still another example of the color filter substrate.

Although in the above embodiment the colored layers 80 and the light shield layer 90 are provided in the parting pixel area G, as shown in FIG. 7 the colored layers 80 and the light shield layer 90 may be provided in an area that is even outside the parting pixel area G. In this case, transmission light can be obtained in the same manner as described above by not forming the reflection film in the portion where the colored layers 80 and the light shield layer 90 are provided. However, in this embodiment, since the colored layers 80 and the light shield layer 90 are located farther from the effective pixel area F than in the embodiments of FIGS. 5 and 6, the area where the protective layer for the color filter layer is formed and the liquid crystal sealing area increase. This embodiment is thus somewhat disadvantageous in terms of miniaturization of the liquid crystal device.

Figure 8:
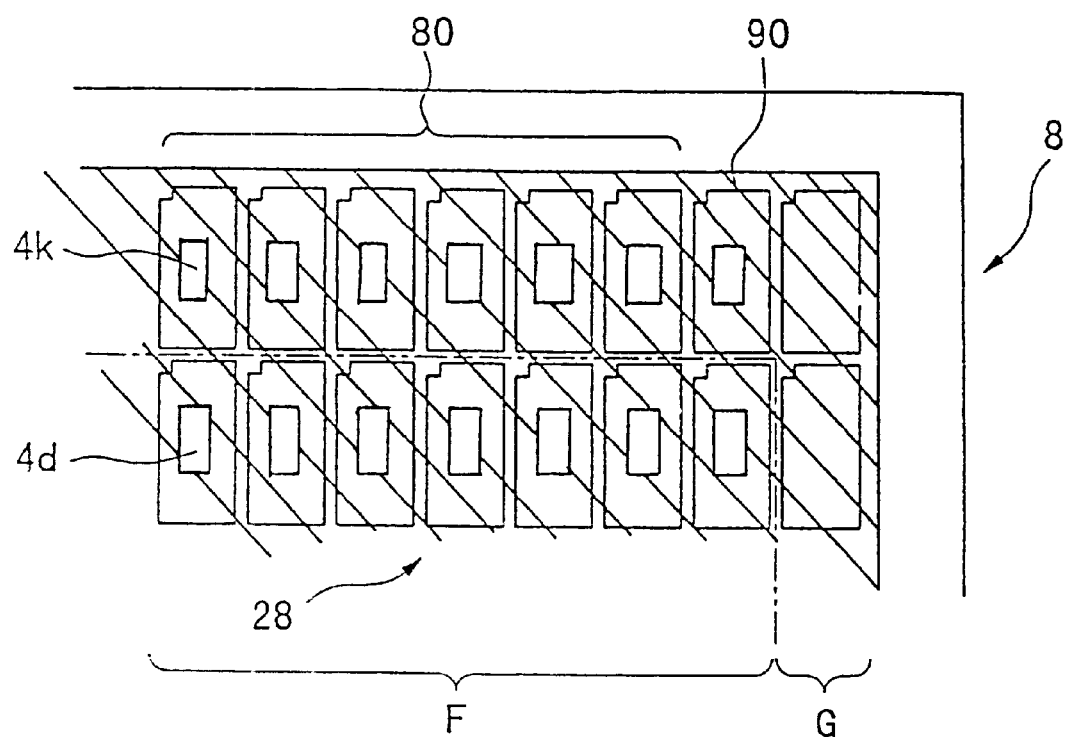
FIG. 8 is a plan view showing a further example of the color filter substrate.

Further, as shown in FIG. 8, second windows 4d may be formed in the reflection film 4 for the respective colored layers in the effective pixel area F of the color filter substrate 8. With this structure, transmission display is performed with the second windows 4d by using a backlight or the like when necessary and reflection display is performed with the portions of the reflection film 4 around the windows 4d; that is, what is called a reflection/transmission type display scheme is realized. That is, having advantages of both of the reflection display type device that is advantageous in power consumption and the transmission display type device that can perform display without being influenced by presence/absence of ambient light, this liquid crystal device can perform clear display while reducing the power consumption by switching the display scheme in accordance with the ambient light. Where the diameter of the second windows 4d is less than 30 µm, it is preferable that as described above the diameter of the windows 4k for the colored layers 80 and the light shield layer 90 be 30 µm or more.

The invention can be applied to not only active matrix liquid crystal devices but also passive matrix liquid crystal devices such as STN liquid crystal devices. Further, in the color filter substrate 8, the transparent electrodes may be omitted by using the reflection film also as electrodes for driving the liquid crystal.

Specific examples of electronic apparatus that are equipped with the liquid crystal device according to the invention will be described below.

Figure 9:
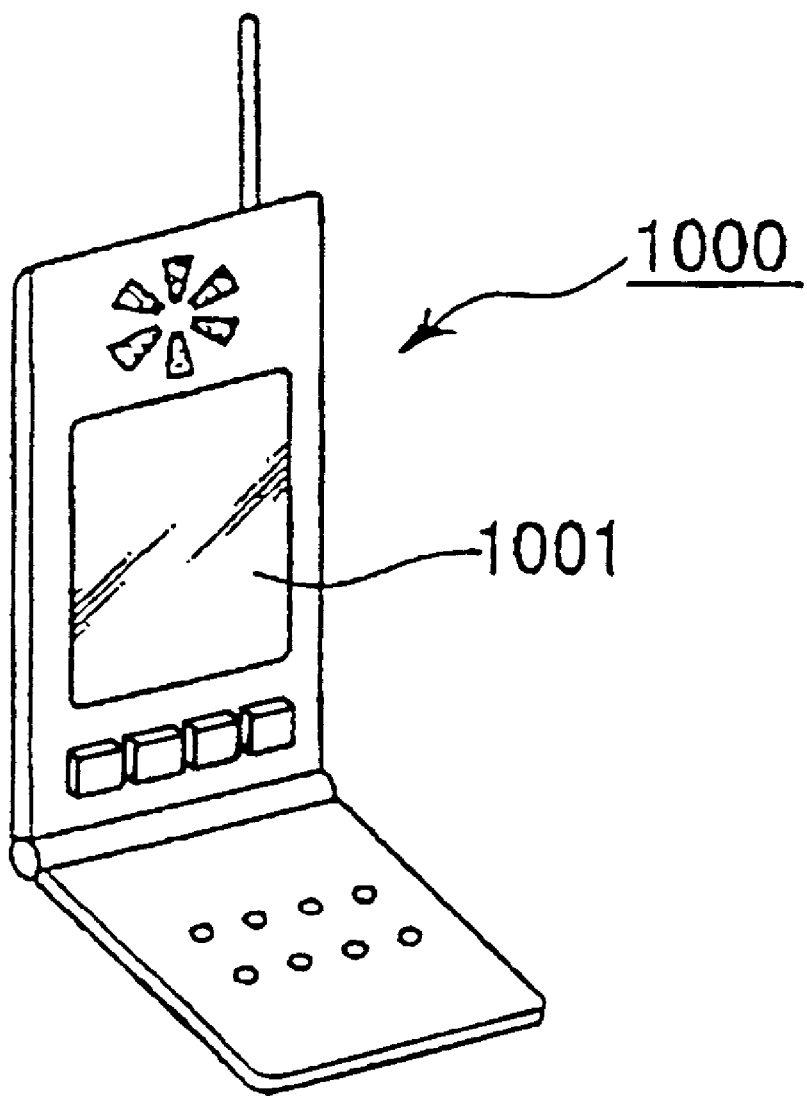
FIG. 9 is a perspective view of an example electronic apparatus that is equipped with the liquid crystal device according to the invention.

FIG. 9 is a perspective view of an example cellular phone.

In this figure, reference numeral 1000 denotes a cellular phone main body and numeral 1001 denotes a liquid crystal display section using the above-described electro-optical device.

Figure 10:
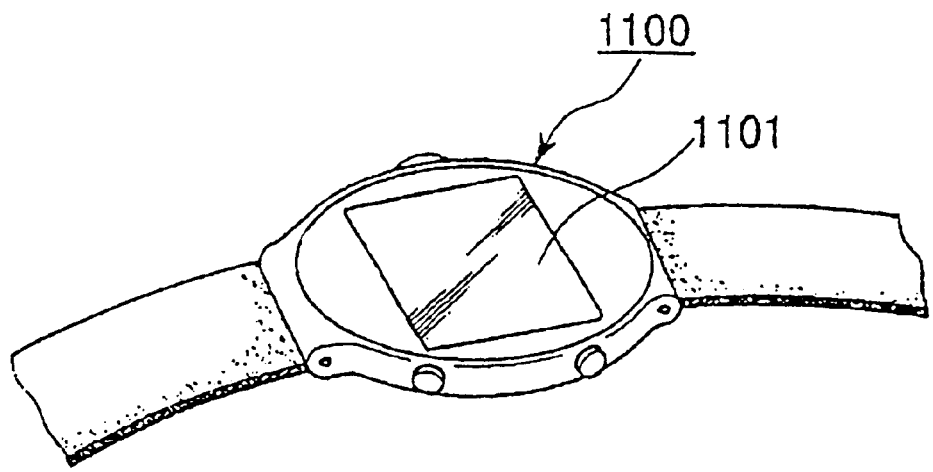
FIG. 10 is a perspective view of another example electronic apparatus that is equipped with the liquid crystal device according to the invention.

FIG. 10 is a perspective view showing an example wrist watch type electronic apparatus.

In this figure, reference numeral 1100 denotes a watch main body and numeral 1101 denotes a liquid crystal display section using the above-described electro-optical device.

Figure 11:
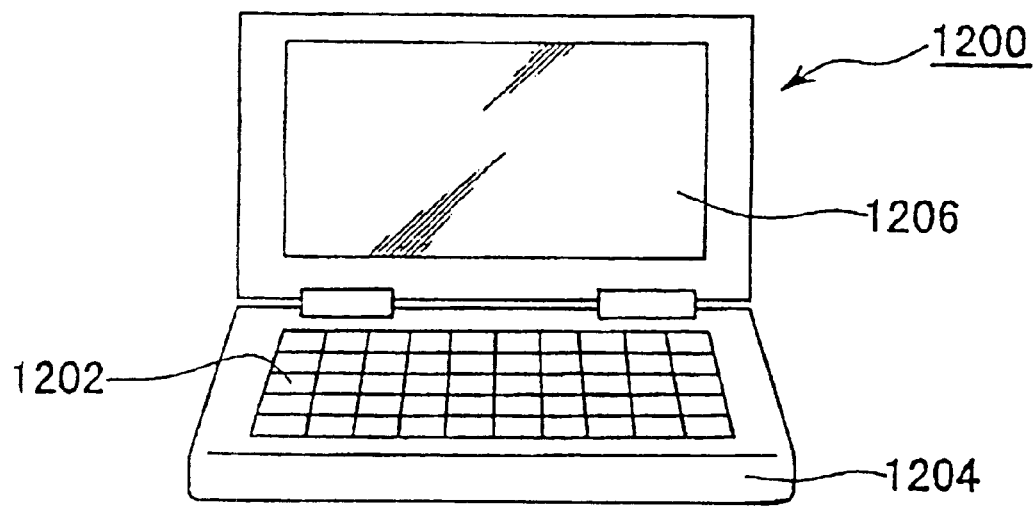
FIG. 11 is a perspective view of still another example electronic apparatus that is equipped with the liquid crystal device according to the invention.
Figure 12:
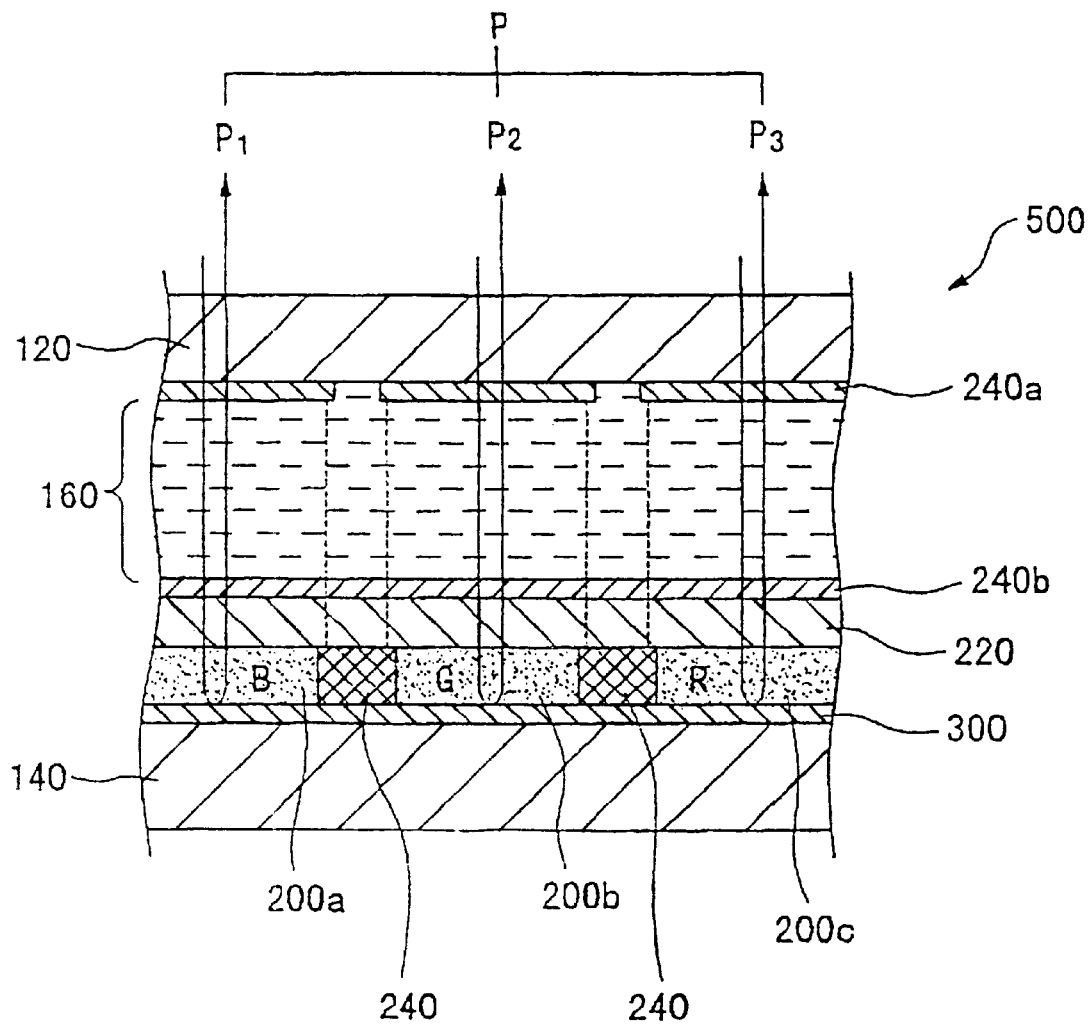
FIG. 12 is a partial sectional view of a conventional liquid crystal device.

FIG. 11 is a perspective view showing an example portable information processing apparatus such as a word processor or a personal computer.

In this figure, reference numeral 1200 denotes an information processing apparatus, 1202 denotes an input section such as a keyboard, 1204 denotes an information processing apparatus main body, and 1206 denotes a liquid crystal display section using the above-described electro-optical device.

Equipped with the liquid crystal display section using the above-described liquid crystal device, the electronic apparatuses of FIGS. 9 to 11 make it possible to perform, with high accuracy, color characteristic evaluation of the colored layers and optical density measurement of the light shield layer. As a result, electronic apparatuses that are superior in color characteristics and light shield characteristic can be realized.

As is apparent from the above description, in the invention, in the color filter substrate having the reflection film, light passes through portions where the reflection film is not formed or windows formed in the reflection film, the portions or the windows being provided between the colored layers for color characteristic evaluation and the substrate and between the light shield layer for optical density measurement and the substrate. Therefore, color characteristic evaluation of the colored layers and optical density measurement of the light shield layer can be performed with high accuracy by measuring a spectrum of transmitted light.

Since the colored layers for color characteristic evaluation and the light shield layer for optical density measurement are provided outside the effective pixel area, the color characteristics, etc. can be evaluated at a position close to the colored layers and the light shield layer in the actual image display area. Therefore, the measurement accuracy is further increased and miniaturization of liquid crystal devices can be attained.

What is claimed is:

1. A liquid crystal device in which a liquid crystal layer is interposed between a color filter substrate and a counter substrate that is opposed to the color filter substrate, characterized in:

that said color filter substrate has, on a surface opposed to said counter substrate, a reflection film and a color filter layer including colored layers and a light shield layer that is provided between the colored layers;

that colored layers for color characteristic evaluation and a light shield layer for optical density measurement are provided outside an effective pixel area of said color filter substrate, the colored layers for color characteristic evaluation being provided at least one for each color; and that each region where said colored layers for color characteristic evaluation and said light shield layer for optical density measurement is formed has a portion where said reflection film is not provided.

2. The liquid crystal device according to claim 1, characterized in that said colored layers for color characteristic evaluation and said light shield layer for optical density measurement are provided in a parting pixel area.

3. The liquid crystal device according to claim 1, characterized in that said colored layers for color characteristic evaluation and said light shield layer for optical density measurement are provided in said parting pixel area at positions close to two respective corners that are located on a diagonal line of said effective pixel area and opposed to each other.

4. The liquid crystal device according to claim 1, characterized in that said light shield layer for optical density measurement is formed by stacking blue, green, and red colored layers.

5. The liquid crystal device according to claim 1, characterized in that in the effective pixel area of said color filter substrate the reflection film is formed with second windows for the respective colored layers.

6. A manufacturing method of the liquid crystal device according to claim 1, characterized by:

causing light to pass through the portions where the reflection film is not provided or said windows of said colored layers for color characteristic evaluation and said light shield layer for optical density measurement, and performing color characteristic evaluation of said colored layers and optical density measurement of said light shield layer by measuring a spectrum of transmitted light.

7. An electronic apparatus characterized by being provided with the liquid crystal device according to claim 1.

8. A liquid crystal device in which a liquid crystal layer is interposed between a color filter substrate and a counter substrate that is opposed to the color filter substrate, characterized in:

that said color filter substrate has, on a surface opposed to said counter substrate, a reflection film and a color filter layer including colored layers and a light shield layer that is provided between the colored layers;

that colored layers for color characteristic evaluation and a light shield layer for optical density measurement are provided outside an effective pixel area of said color filter substrate, the colored layers for color characteristic evaluation being provided at least one for each color; and that each region where said colored layers for color characteristic evaluation and said light shield layer for optical density measurement is formed has part of said reflection film formed with a window.

9. The liquid crystal device according to claim 8, characterized in that a diameter of said window is 30 $\mu$m or greater.

10. The liquid crystal device according to claim 8, characterized in that said colored layers for color characteristic evaluation and said light shield layer for optical density measurement are provided in a parting pixel area.

11. The liquid crystal device according to claim 8, characterized in that said colored layers for color characteristic evaluation and said light shield layer for optical density measurement are provided in said parting pixel area at positions close to two respective corners that are located on a diagonal line of said effective pixel area and opposed to each other.

12. The liquid crystal device according to claim 8, characterized in that said light shield layer for optical density measurement is formed by stacking blue, green, and red colored layers.

13. The liquid crystal device according to claim 8, characterized in that in the effective pixel area of said color filter substrate the reflection film is formed with second windows for the respective colored layers.

14. A manufacturing method of the liquid crystal device according to claim 8, characterized by:

causing light to pass through the portions where the reflection film is not provided or said windows of said colored layers for color characteristic evaluation and said light shield layer for optical density measurement, and performing color characteristic evaluation of said colored layers and optical density measurement of said light shield layer by measuring a spectrum of transmitted light.

15. An electronic apparatus characterized by being provided with the liquid crystal device according to claim 8.

16. A liquid crystal device in which a liquid crystal layer is interposed between a color filter substrate and a counter substrate that is opposed to the color filter substrate, characterized in:

that said color filter substrate has, on a surface opposed to the counter substrate, a reflection film and a color filter layer including colored layers;

that colored layers for color characteristic evaluation are provided at least one for each color outside an effective pixel area of said color filter substrate; and that each region where the colored layers for color characteristic evaluation is formed has a portion where said reflection film is not provided.

17. A manufacturing method of the liquid crystal device according to claim 16, characterized by:

causing light to pass through the portions where the reflection film is not provided or said windows of said colored layers for color characteristic evaluation and said light shield layer for optical density measurement, and performing color characteristic evaluation of said colored layers and optical density measurement of said light shield layer by measuring a spectrum of transmitted light.

18. An electronic apparatus characterized by being provided with the liquid crystal device according to claim 16.

19. A liquid crystal device in which a liquid crystal layer is interposed between a color filter substrate and a counter substrate that is opposed to the color filter substrate, characterized in:

that said color filter substrate has, on a surface opposed to said counter substrate, a reflection film and a color filter layer including colored layers and a light shield layer that is provided between the colored layers; and that a light shield layer for optical density measurement is provided outside an effective pixel area of said color filter substrate, and a region where the light shield layer for optical density measurement is formed has a portion where said reflection film is not provided.

20. A manufacturing method of the liquid crystal device according to claim 19, characterized by:

causing light to pass through the portions where the reflection film is not provided or said windows of said colored layers for color characteristic evaluation and said light shield layer for optical density measurement, and performing color characteristic evaluation of said colored layers and optical density measurement of said light shield layer by measuring a spectrum of transmitted light.

21. An electronic apparatus characterized by being provided with the liquid crystal device according to claim 19.

* * * * *

UNITED STATES PATENT AND TRADEMARK OFFICE
CERTIFICATE OF CORRECTION

PATENT NO. : 6,573,960 B2
DATED : June 3, 2003
INVENTOR(S) : Masaki Kobayashi et al.

It is certified that error appears in the above-identified patent and that said Letters Patent is hereby corrected as shown below:

Title page,
Item [56], References Cited, FOREIGN PATENT DOCUMENTS, add:
-- KR 1998-068059     12/1998 --
OTHER PUBLICATIONS, add:
-- Notice of Preliminary Rejection from Korean IPO 1/24/2003 --

Column 5,
Line 3, "thin" should be -- tin --.
Line 63, "layer" should be -- layers --.

Signed and Sealed this

Twenty-third Day of March, 2004

JON W. DUDAS
*Acting Director of the United States Patent and Trademark Office*